US011652791B2

(12) United States Patent
Moreno et al.

(10) Patent No.: US 11,652,791 B2
(45) Date of Patent: May 16, 2023

(54) CONSOLIDATED ROUTING TABLE FOR EXTRANET VIRTUAL NETWORKS

(71) Applicant: Cisco Technology, Inc., San Jose, CA (US)

(72) Inventors: Victor Moreno, Carlsbad, CA (US); Sanjay Kumar Hooda, Pleasanton, CA (US); Marc Portoles Comeras, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 624 days.

(21) Appl. No.: 16/534,783

(22) Filed: Aug. 7, 2019

(65) Prior Publication Data
US 2021/0044565 A1 Feb. 11, 2021

(51) Int. Cl.
*H04L 9/40* (2022.01)
*H04L 45/586* (2022.01)
*H04L 45/745* (2022.01)

(52) U.S. Cl.
CPC ........ *H04L 63/0236* (2013.01); *H04L 45/586* (2013.01); *H04L 45/745* (2013.01); *H04L 63/029* (2013.01); *H04L 63/0263* (2013.01); *H04L 63/0272* (2013.01)

(58) Field of Classification Search
CPC . H04L 63/0236; H04L 45/586; H04L 45/745; H04L 63/0263; H04L 63/0272; H04L 63/029; H04L 63/166
See application file for complete search history.

(56) References Cited

U.S. PATENT DOCUMENTS

| 6,594,704 | B1 | 7/2003 | Birenback et al. |
| 8,661,525 | B2 | 2/2014 | Yan et al. |
| 2003/0086422 | A1* | 5/2003 | Klinker ............... H04L 65/1101 370/235 |
| 2009/0080387 | A1* | 3/2009 | Dell'Uomo ............. H04W 8/12 370/338 |
| 2012/0182978 | A1* | 7/2012 | Masputra .............. H04L 69/161 370/338 |
| 2017/0316106 | A1* | 11/2017 | Pillay-Esnault ...... H04L 61/103 |

(Continued)

OTHER PUBLICATIONS

Moreno et al., "LISP Virtual Private Networks (VPNS)," IETF, May 16, 2019.

*Primary Examiner* — Cheng-Feng Huang
(74) *Attorney, Agent, or Firm* — Polsinelli

(57) ABSTRACT

Systems, methods, and computer-readable media for implementing an extranet policy include receiving a request from a source to perform a lookup for a destination address. A lookup for the destination address is performed in a consolidated routing table, the consolidated routing table including a consolidated mapping of address prefixes associated with two or more virtual networks. If the lookup results in a match for the destination address with a matching address prefix, a matching virtual network associated with the matching address prefix is determined. An access policy for the request corresponding to the matching virtual network is obtained, and based on the access policy the request is allowed to access the destination address in the matching virtual network or disallowed. The consolidated routing table can be implemented in a mapping server using a Locator/ID Separation Protocol (LISP).

20 Claims, 9 Drawing Sheets

(56) References Cited

U.S. PATENT DOCUMENTS

2018/0039662 A1* 2/2018 Asai .................... G06F 16/9027
2018/0367337 A1 12/2018 Jain et al.
2019/0020489 A1 1/2019 Moreno et al.
2019/0103993 A1* 4/2019 Cidon ................. H04L 41/0895
2019/0236178 A1* 8/2019 Jagota ................. G06F 16/2246

* cited by examiner

CONSOLIDATED ROUTING TABLE FOR EXTRANET VIRTUAL NETWORKS

TECHNICAL FIELD

The subject matter of this disclosure relates in general to the field of computer networking, and more particularly to consolidated routing tables for extranet virtual networks.

BACKGROUND

The enterprise network landscape is continuously evolving. There is a greater demand for mobile and Internet of Things (IoT) device traffic, Software as a Service (SaaS) applications, and cloud adoption. In recent years, software-defined enterprise network solutions have been developed to address the needs of enterprise networks. Software-defined enterprise networking is part of a broader technology of software-defined networking (SDN) that includes both software-defined wide area networks (SDWAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and the LAN.

The SDLAN, e.g. Cisco® SD-Access, domain uses constructs of Virtual Networks (VNs)/Scalable Group Tags (SGTs) for network segmentation with two-way connectivity between SGTs. The SDWAN domain uses constructs of VNs and can potentially use SGTs for network segmentations with two-way connectivity between VNs and potentially SGTs. The SDN datacenter domain supports multi-tenancy with each tenant having their own internet protocol (IP) address space (and possibly overlapping IP addresses as between two or more tenants), segmentation of a tenant by multiple VRFs, and segmentation of VRFs by multiple endpoint groups (EPGs) with one-way connectivity between EPGs (requiring explicit policy/contract to enable two-way connectivity).

A virtual private network (VPN) extends a private network across a public network, and enables users to send and receive data across shared or public networks as if their computing devices were directly connected to the private network. Applications running on a computing device, e.g. a laptop, desktop, smartphone, across a VPN may therefore benefit from the functionality, security, and management of the private network.

Two or more VPNs can be correlated to each other in order to allow controlled communication between end points present in different VPNs. The correlation between the VPNs can be based on connectivity policies. An example of a policy for cross VPN connectivity is referred to as an extranet. In the following description, internet protocol (IP) address prefixes (or IP prefixes) corresponding to nodes are mentioned, which may alternatively be referred to more generally as addresses or address prefixes of nodes. In an extranet, shared IP prefixes in a shared VPN can establish connections with private IP prefixes that reside in private VPNs without allowing endpoints in different private VPNs to communicate with each other. Thus, private IP prefixes may reach shared IP prefixes and the shared IP prefixes may reach all private IP prefixes, but private IP prefixes in a private VPN cannot reach private IP prefixes in a different private VPN.

Extranet functionality according to the above policy has been traditionally implemented by importing IP prefixes from the shared VPN into the various private VPNs and correspondingly importing IP prefixes from the private VPNs into the shared VPN. VPN routing tables are used for routing traffic according to the connectivity policy. The routing tables may be configured according to a radix tree, referred to in the art as a "radix trie". As a result of importing prefixes into the shared and private VPNs, reachability and information in the VPN routing tables or radix tries are replicated and maintained in each of the various VPNs. This replication is inefficient in terms of resource utilization. For example, a complete radix trie inclusive of the prefixes native to each VPN, plus all prefixes imported from other VPNs is created for each of the two or more VPNs in conventional implementations.

The conventional implementations with multiple routing tables or radix tries also require the extranet policies for shared and private VPNs to be applied before a lookup of the routing table is completed. In cases where policies for extranet connectivity are based on attributes of the destination of traffic, multiple lookups may be needed to first access the attributes of the destination and then based on the attributes, to apply corresponding policies. The multiple lookups are also another source of inefficiency.

In some examples of extranet policies, a Locator/ID Separation Protocol (LISP) can be used to reduce some of the inefficiencies discussed above. LISP functionality can be deployed on endpoint routers connected to the VPNs. An endpoint router can include an egress tunnel router (ETR) and an ingress tunnel router (ITR), where the ETR and ITR are together referred to as an xTR. The LISP can reduce the amount of cross VPN state held at an xTR of a VPN by including only the state corresponding to connections that have been resolved and established across VPNs, and excluding unresolved state across VPNs from being imported into the xTR.

A mapping system connected to the xTRs can be used for managing traffic across the different VPNs. The mapping system can include radix tries for managing the traffic. However, the radix tries in the mapping system may be designed as merged radix tries to allow cross VPN lookups. For example, the data structures in the mapping system can be structured similar to a traditional extranet by importing prefixes across VPNs to create full radix tries for each VPN (including imported IP prefixes). This results in multiple merged radix tries (one per VPN), which suffers from the same scale inefficiencies experienced in traditional extranet methods discussed above.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
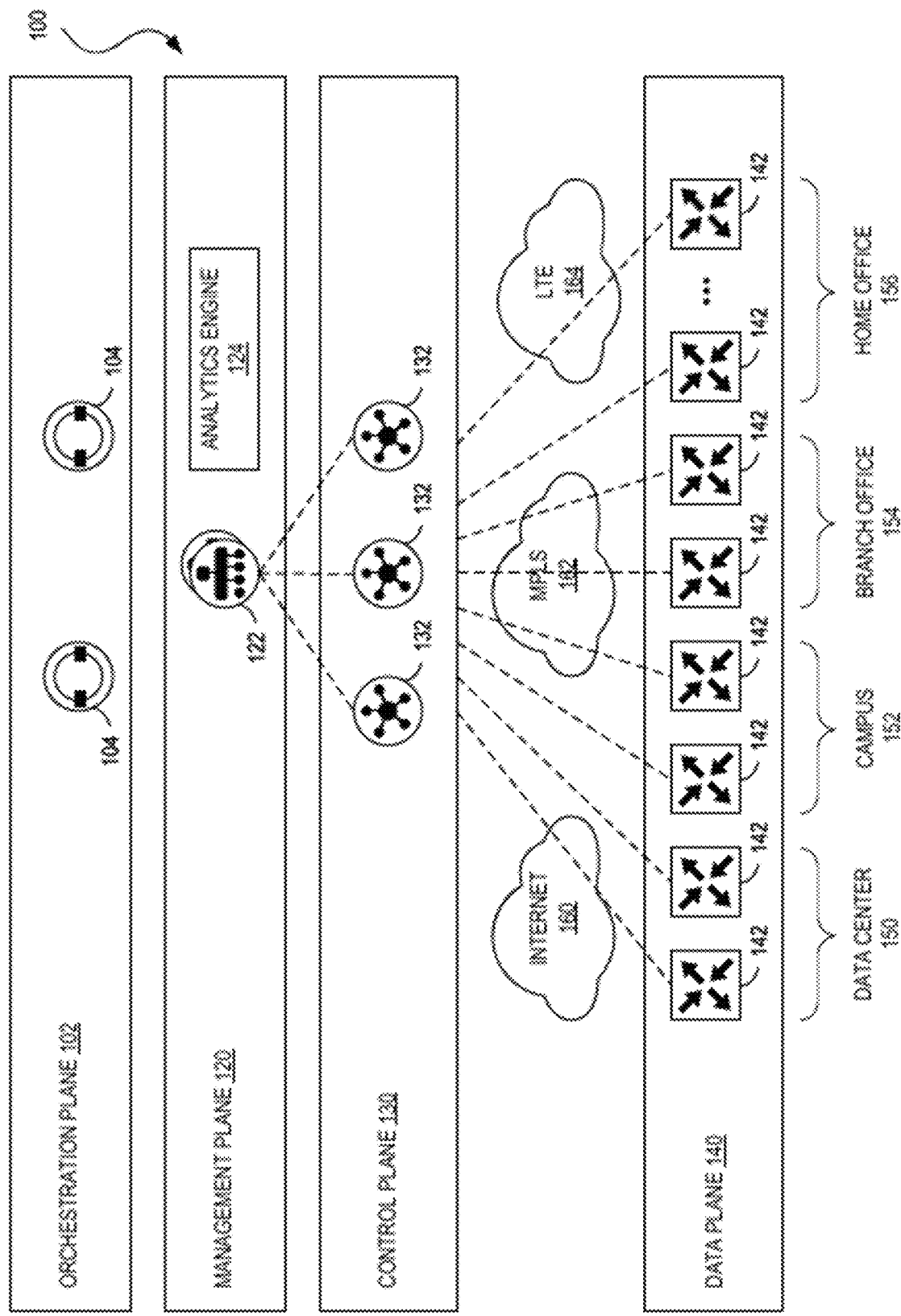
FIG. 1 illustrates a high-level network architecture, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for implementing an extranet policy. In some examples, a request can be received at a mapping system from a source to perform a lookup for a destination address. A lookup for the destination address is performed in a consolidated routing table implemented by the mapping system, the consolidated routing table including a consolidated mapping of address prefixes associated with two or more virtual networks. If the lookup results in a match for the destination address with a matching address prefix, a matching virtual network associated with the matching address prefix is determined. An access policy for the request corresponding to the matching virtual network is determined, and based on the access policy the request to access the destination address in the matching virtual network is allowed or disallowed. The consolidated routing table can be implemented in a mapping server using a Locator/ID Separation Protocol (LISP).

In some examples, a method is provided. The method comprises receiving a request from a source to perform a lookup for a destination address; performing a lookup for the destination address in a consolidated routing table, the consolidated routing table comprising a consolidated mapping of address prefixes associated with two or more virtual networks; if the lookup results in a match for the destination address with a matching address prefix, determining a matching virtual network associated with the matching address prefix; determining an access policy for the request corresponding to the matching virtual network; and based on the access policy, allowing or disallowing the request to access the destination address in the matching virtual network.

In some examples, a system, is provided, the system comprising one or more processors; and a non-transitory computer-readable storage medium containing instructions which, when executed on the one or more processors, cause the one or more processors to perform operations including: receiving a request from a source to perform a lookup for a destination address; performing a lookup for the destination address in a consolidated routing table, the consolidated routing table comprising a consolidated mapping of address prefixes associated with two or more virtual networks; if the lookup results in a match for the destination address with a matching address prefix, determining a matching virtual network associated with the matching address prefix; determining an access policy for the request corresponding to the matching virtual network; and based on the access policy, allowing or disallowing the request to access the destination address in the matching virtual network.

In some examples, a non-transitory machine-readable storage medium is provided, including instructions configured to cause a data processing apparatus to perform operations including: receiving a request from a source to perform a lookup for a destination address; performing a lookup for the destination address in a consolidated routing table, the consolidated routing table comprising a consolidated mapping of address prefixes associated with two or more virtual networks; if the lookup results in a match for the destination address with a matching address prefix, determining a matching virtual network associated with the matching address prefix; determining an access policy for the request corresponding to the matching virtual network; and based on the access policy, allowing or disallowing the request to access the destination address in the matching virtual network.

In some examples, the consolidated routing table comprises a radix trie for mapping respective address prefixes of the matching virtual network to an address of a home node of the matching virtual network. In some examples, allowing the request to access the destination address in the matching virtual network comprises using the radix trie to route the request to the home node of the matching virtual network. Some examples further comprise providing the address of the home node and a routing locator corresponding to the request, to the source.

In some examples, determining the matching virtual network associated with the matching address prefix comprises obtaining a color associated with the matching address prefix and evaluating the request based on the color. In some examples, the color is an attribute or metadata associated with the matching address prefix.

In some examples of the method, the access policy is an extranet policy for the two or more virtual networks, wherein the extranet policy comprises one or more of allowing access to a shared virtual network from one or more private virtual networks, allowing access to one or more private virtual networks from the shared virtual network, or preventing access from one private virtual network to another private virtual network.

In some examples, if the lookup does not result in a match or if the access policy indicates disallowing the request, providing a negative map-reply to the source.

In some examples, the two or more virtual networks are connected to respective two or more ingress/egress tunnel routers (xTRs), and wherein the consolidated routing table is implemented in a map server in Locator/ID Separation Protocol (LISP) based communication with the two or more xTRs.

In some examples, all address prefixes of the consolidated routing table are unique addresses.

Description of Example Embodiments

FIG. 1 illustrates an example of a network architecture 100 for implementing aspects of the present technology. An example of an implementation of the network architecture 100 is the Cisco® Software Defined Wide Area Network (SD-WAN) architecture. In some examples, the network architecture 100 can correspond to an enterprise network. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure.

In the illustrated example, the network architecture 100 includes an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some aspects, the network orchestrator appliance(s) 104 can also enable communication of devices located behind Network Address Translation (NAT). In some aspects, physical or virtual Cisco® SD-WAN vBond appliances can operate as the network orchestrator appliance(s) 104.

The management plane 120 can be responsible for central configuration and monitoring of the network architecture 100. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some examples, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some examples, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
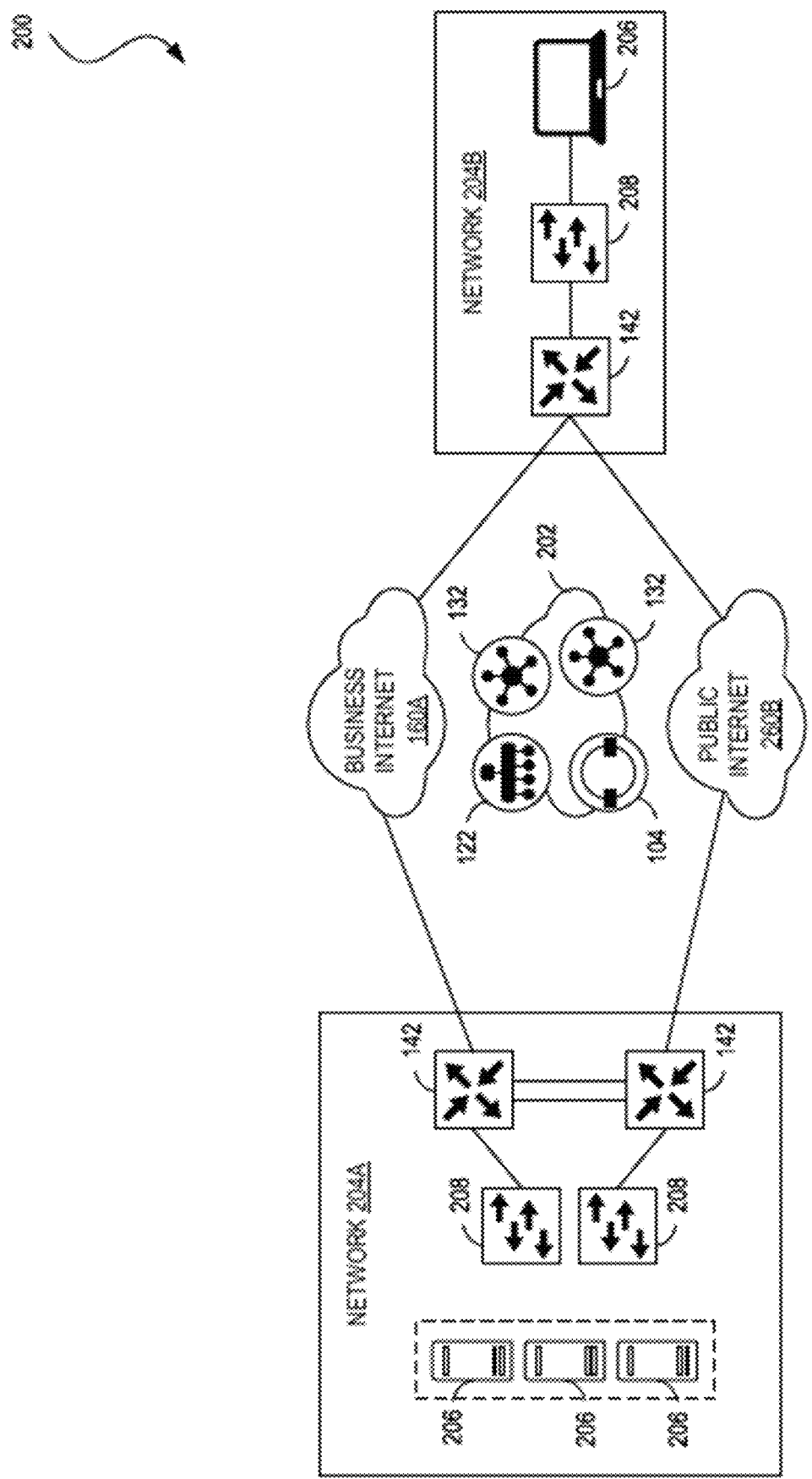
FIG. 2 illustrates a network topology in accordance with some examples.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can include any number of network devices in any network topology, including multi-tier (e.g., core, distribution, and access tiers), spine-and-leaf, mesh, tree, bus, hub and spoke, and so forth. For example, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some examples, "color" can be used to identify an individual transport network, and different transport networks may be assigned different colors (e.g., mpls, private1, biz-internet, metro-ethernet, lte, etc.). For example, the network topology 200 can utilize a color called "biz-internet" for the Internet transport network 160A and a color called "public-internet" for the Internet transport network 160B.

In some examples, each edge network device 208 can form a Datagram Transport Layer Security (DTLS) or TLS control connection to the network controller appliance(s) 132 and connect to any network control appliance 132 over each transport network 160. In some examples, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
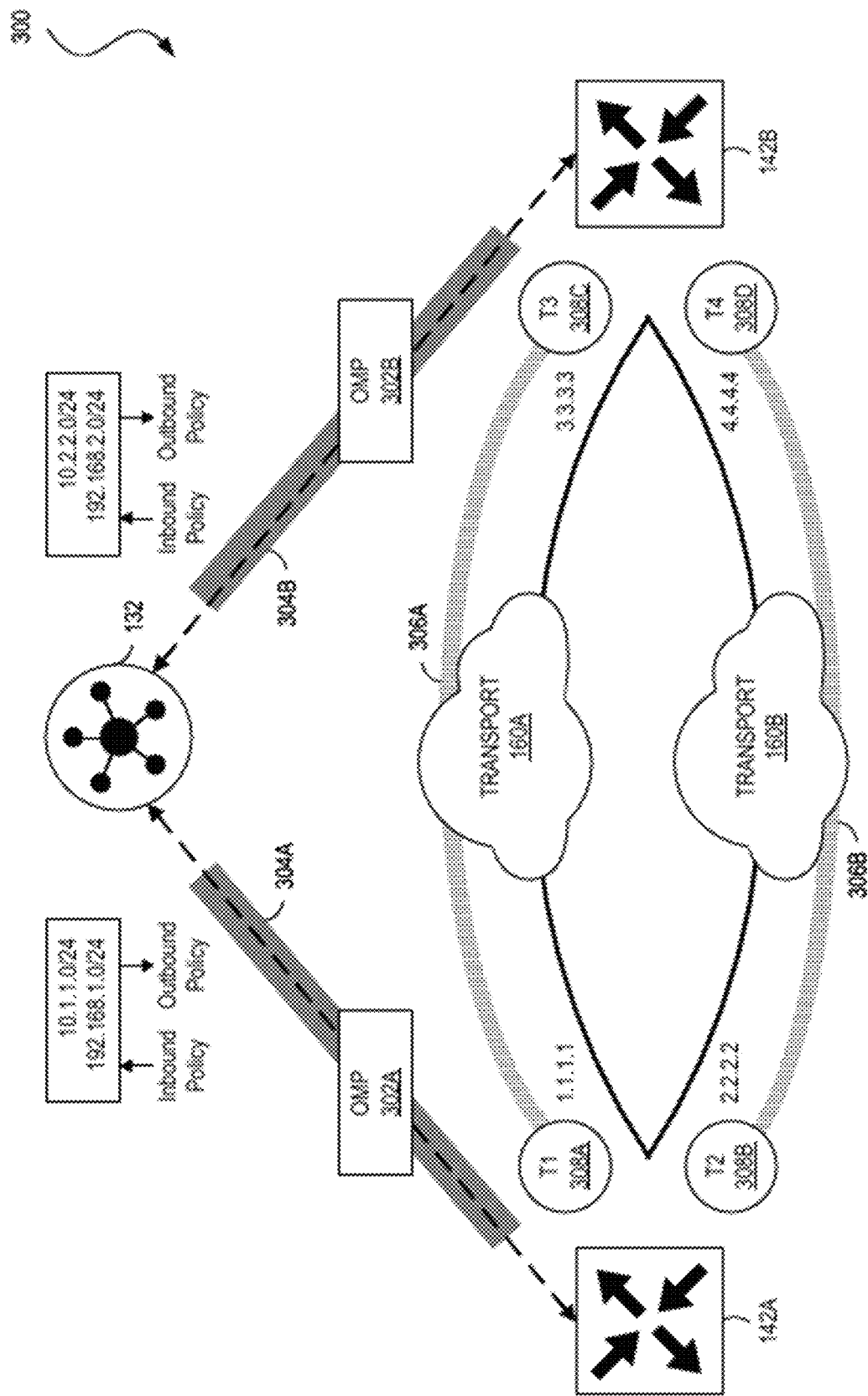
FIG. 3 illustrates an operation of a protocol for managing an overlay network, in accordance with some examples.

FIG. 3 illustrates an example of operation 300 of an overlay management protocol (OMP), which may be used in some examples to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

The OMP can advertise different OMP routes. In an example, an OMP route can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

In another example, OMP routes can include TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

In another example, OMP routes can include Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
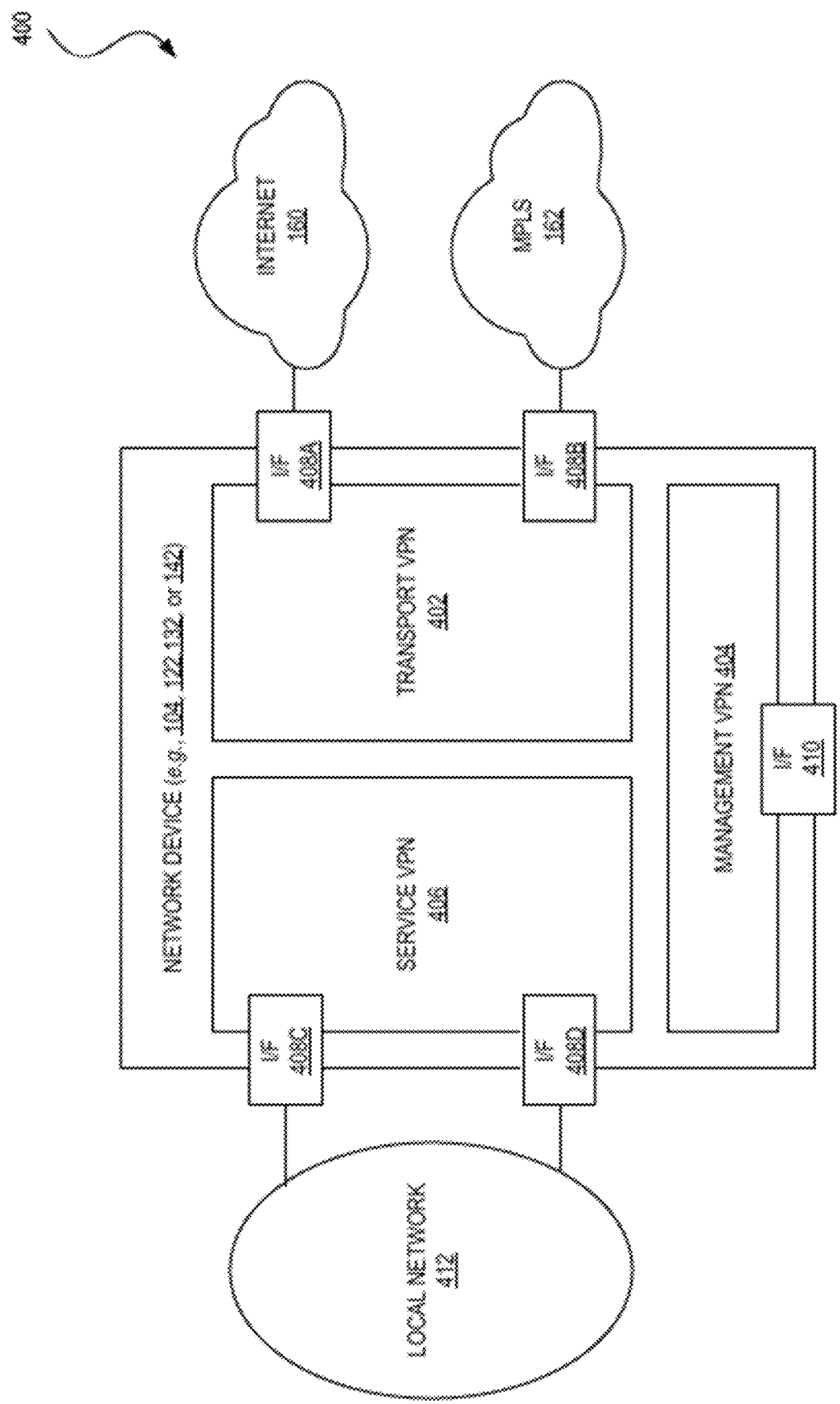
FIG. 4 illustrates an operation of virtual private networks for segmenting a network, in accordance with some examples.

FIG. 4 illustrates an example of operation 400 of two or more VPNs. In some examples, the operation 400 can provide segmentation for a network (e.g., the network architecture 100). In some examples, two or more VPNs can be isolated from one another and can have their own forwarding or routing tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some examples, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5:
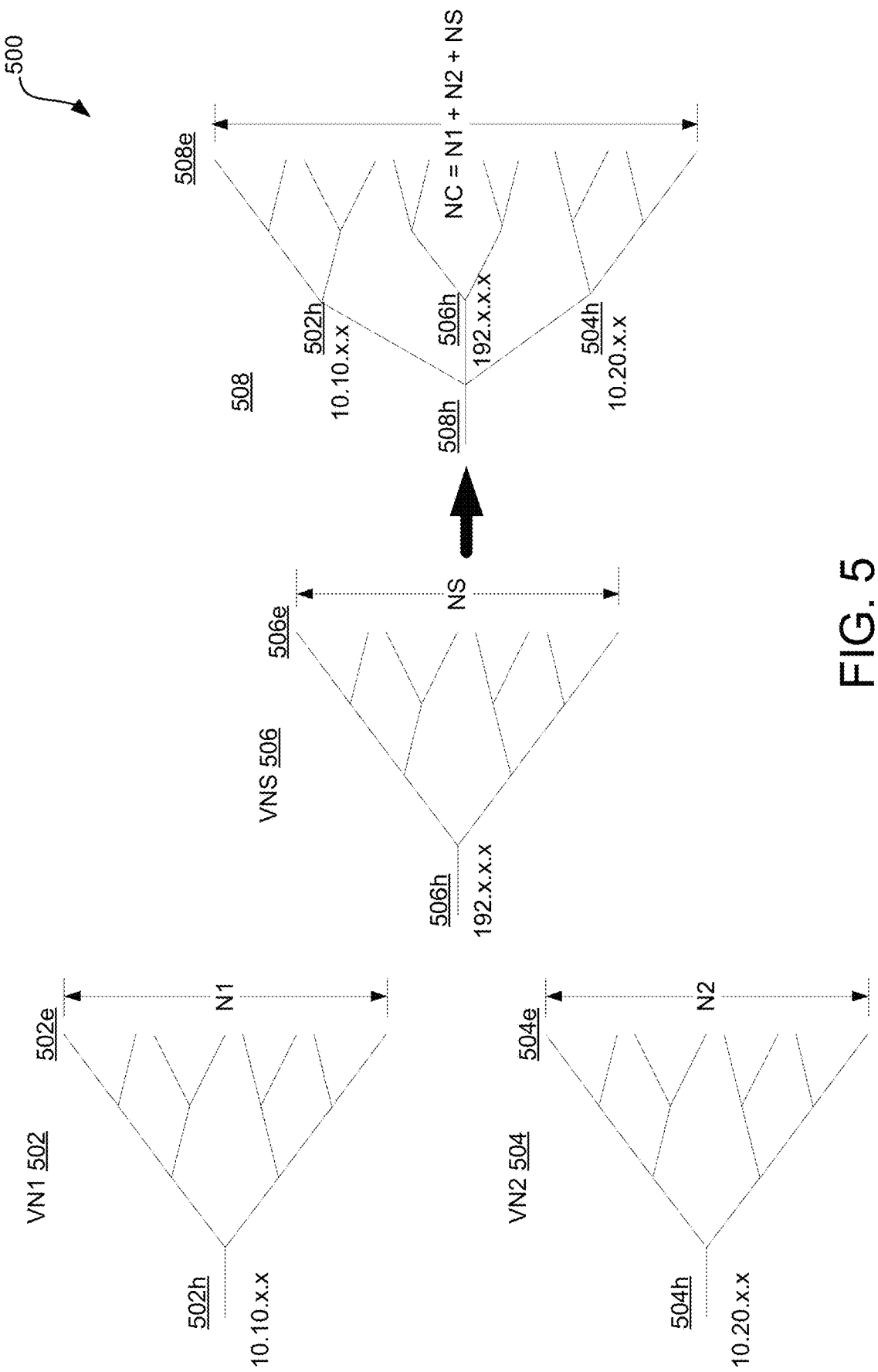
FIG. 5 illustrates aspects of a consolidated routing trie for two or more virtual networks, in accordance with some examples.

FIG. 5 illustrates aspects of an example network 500 according to this disclosure. The network 500 may be configured according to the network architecture 100. In an illustrative example, the network 500 can include two or more virtual networks (e.g., VPNs). In FIG. 5, two private virtual networks VN1 502 and VN2 504, and a shared virtual network VNS 506 of the network 500 are identified. The virtual networks 502-506 can be isolated and segmented according to the operation 400 of FIG. 4 or an extranet or connectivity policy according to this disclosure. In some examples, the virtual networks 502-506 can communicate according to an extranet policy which can utilize a Locator/ID Separation Protocol (LISP) protocol. Aspects of the routing within and amongst the various virtual networks 502-506 will first be described in FIG. 5, following by example implementations in LISP systems in FIG. 6.

In some examples, the two private virtual networks VN1 502 and VN2 504 can include private IP prefixes and the shared virtual network VNS 506 can include shared IP prefixes. In an example virtual network connectivity or extranet policy, shared IP prefixes in the shared virtual network VNS 506 can establish connections with private IP prefixes that reside in private virtual networks VN1 502 and VN2 504, without allowing endpoints in the private virtual networks VN1 502 and VN2 504 to communicate with each other. Thus, private IP prefixes in the private virtual networks VN1 502 and VN2 504 may reach or connect with shared IP prefixes in the shared virtual network VNS 506 and the shared IP prefixes in the shared virtual network VNS 506 may reach or connect with the private IP prefixes in the private virtual networks VN1 502 and VN2 504. However, the private IP prefixes in the private virtual network VN1 502 is prevented from reaching or connecting with private IP prefixes in in the private virtual network VN2 504 and vice versa.

Each of the virtual networks 502-506 can include interconnections which can be routed using respective radix tries. Although a radix trie is shown, any other routing table can also be used for routing traffic through the network interconnections in other examples. The radix trie implemented in the virtual network VN1 502, for example, can include a routing between home node 502$h$ (e.g., a controller or spine router/switch), optionally through one or more levels of interconnecting nodes and N1 leaf nodes 502$e$ (e.g., routers/ switches). The home node 502*h* can be interconnected to the N1 leaf nodes 502*e*, and the leaf nodes 502*e* can in turn connect the fabric of the virtual network VN1 502 to one or more other virtual networks, an overlay, or logical portion of the network (e.g., the network architecture 100), which can include application services, servers, virtual machines, containers, endpoints, etc. The leaf nodes 502*e* can be, for example, top-of-rack ("ToR") switches, aggregation switches, gateways, ingress and/or egress switches, provider edge devices, and/or any other type of routing or switching device. The virtual network VN2 504 can similarly include a radix trie for interconnections between a home node 504*h*, optionally one or more intermediate nodes, and N2 leaf nodes 504*e*; and the virtual network VNS 506 can include a radix trie for interconnections between a home node 506*h*, optionally one or more intermediate nodes, and NS leaf nodes 506*e*.

In an example, the connectivity policy among the virtual networks 502-506 can include an extranet policy where the IP address space across the virtual networks 502-506 is non-overlapping. For example, the IP addresses across the virtual networks 502-506 are unique and are not reused. This is illustrated with the example IP prefixes for the home nodes 502*h* (10.10.x.x), 504*h* (10.20.x.x), and 506*h* (192.x.x.x) being in non-overlapping address spaces, which leads to IP addresses in the various leaf nodes of the virtual networks 502-506 also being in non-overlapping domains.

In some examples the unique IP addresses across the virtual networks 502-506 can be consolidated to include a consolidated radix trie, which will be discussed in further detail below. In example aspects, the consolidated radix trie which consolidates the radix tries of the virtual networks 502-506 can overcome the wasteful and inefficient importing and replication of radix tries in each of two or more virtual networks as in the case of the conventional approaches discussed previously.

As previously mentioned with respect to the network architecture 100, color can be used to identify and distinguish different networks. In example aspects, the radix tries of each of the virtual networks 502-506 can be consolidated based on coloring the individual radix tries of the virtual networks 502-506, to aid the routing within the consolidated radix trie to destinations within the individual virtual networks 502-506.

In an example, instance identifiers (IIDs) for the various virtual networks 502-506 can be used for coloring respective radix tries. In one example, the IIDs can include the home nodes or home IIDs, while keeping in mind that other attributes can be used for coloring in other examples. For example, the radix tries of each of the virtual networks 502-506 can be colored with the respective home IIDs. This way, each endpoint node or leaf node of the radix tries can include the color or designation of the home IID to which the endpoint belongs. For example, the N1 leaf nodes 502*e* can be colored with their respective home IID of the home node 502*h*, for the virtual network VN1 502 Similarly, the N1 leaf nodes 502*e* can be colored with their respective home IID of the home node 502*h*, for the virtual network VN1 205; and the NS leaf nodes 506*e* can be colored with their respective home IID of the home node 506*h*, for the virtual network VNS 506.

With the radix tries colored as noted in the above example, the radix tries of the virtual networks 502-506 can be consolidated to form a consolidated radix trie 508. The consolidated radix trie can be implemented in a mapping system or a map server of a LISP system. The mapping system can be provided in a controller such as the network controller appliance 132 of FIGS. 1-3, in some aspects, where the mapping system can implement the extranet policies for lookups in the consolidated radix trie. The consolidated radix trie can include a sum of all the endpoints or leaf nodes of the virtual networks 502-506 to include NC=N1+N2+NS leaf nodes 508*e*. The IP prefixes for the NC leaf nodes 508*e* are unique because of the non-overlapping nature of the IP addresses among the virtual networks 502-506. In an example, among the NC leaf nodes 508*e*, N1 of the leaf nodes belonging to the radix trie for the virtual network VN1 502 will colored with the home IID of the home node 502*h*; N2 of the leaf nodes belonging to the radix trie for the virtual network VN2 504 will colored with the home IID of the home node 504*h*; and NS of the leaf nodes belonging to the radix trie for the virtual network VNS 506 will be colored with the home IID of the home node 506*h*. A home node 508*h* of the consolidated radix trie can be connected to the different home nodes 502*h*, 504*h*, and 506*h*, as shown.

In some examples, a lookup for the consolidated radix trie can be received at the mapping system. A request for reaching a destination in any one of the virtual networks 502-506 can be received from a source which may reside within one of the virtual networks 502-506 or in any other node or device of the network 500 which may be external to the virtual networks 502-506. The source may have an associated source IID and the destination may have an associated destination endpoint identifier (EID). Together, the source IID and the destination EID of the request may form a tuple. The destination EID of the request can include an IP address which may be evaluated for a match with one of the NC leaf nodes 508*e* of the consolidated radix trie. If a match is found at a particular leaf node of the NC leaf nodes 508*e* (referred to as the matching leaf node), then the color for the matching leaf node can be obtained, which will reveal the home IID for the matching leaf node 508*e*. The home IID obtained from the matching leaf node can evaluated against the tuple to identify associated extranet policies which may control whether the request can be serviced or allowed.

For example, if the request originated at the virtual network VN1 502, the source IID of the tuple would indicate an IP prefix in the virtual network VN1 502. If the destination EID of the request is in the shared virtual network VNS 506, then the request may be allowed to proceed, as per the extranet policy explained above. The mapping system may permit this request to proceed by evaluating the destination EID of the request against the color or home IID of the matching leaf node and determining that the home IID resides in the shared virtual network VNS 506, for which access is allowed from the virtual network VN1 502. In some examples, the mapping system can provide a response, referred to as a map-reply which includes the home IID obtained from the color of the matching leaf node, as well as a routing locator (RLOC) for the destination EID of the request, to the source or originator of the request. This way, the request may be routed to its destination EID using the home IID and the RLOC within the shared virtual network VNS 504.

In some examples, a request originated at the virtual network VN2 504 with a destination in the shared virtual network VNS 506 can be treated similarly by the mapping system as discussed in the above example. Further, a request originated at the shared virtual network VNS 506 with a destination in either one of the private virtual networks VN1

502 or VN2 504 can be also be allowed to proceed, and be treated similarly by the mapping system as discussed in the above example.

On the other hand, if source IID of the request is in one of the private virtual networks e.g., VN1 502, and the destination EID of the request is in another private virtual network, e.g., VN2 504, then the request may be prevented or disallowed from proceeding, per the extranet policy explained above. For example, the mapping system may not allow this request to proceed by evaluating the destination EID of the request against the color or home IID of the matching leaf node and determining that the home IID resides in the virtual network VN2 504, for which access is not allowed from the virtual network VN1 502. In some examples, the mapping system may treat such a request as a lookup miss and provide a negative map-reply in response to the source or originator. The negative map-reply may also include a specified or defined action for the source. In some examples, the specified or defined action in the negative map-reply to the source can include a drop, copy or forward native action for the request. In some examples, the negative map-reply can include a default mapping of consolidated routing trie, to convey to the source the extranet policies which may be implemented therein.

Accordingly, the consolidated radix trie can efficiently implement the extranet policy for various virtual networks (while avoiding the drawbacks of the conventional approaches of importing and replication in each of the virtual networks as in conventional approaches). While the home IIDs can include one example of the color for designating the component virtual networks within the consolidated radix trie, various other attributes may be used in other examples to identify and designate the individual radix tries of the different virtual networks. In some examples, non-extranet virtual networks which may allow reuse of IP addresses can also be consolidated upon translating their IP addresses into domains which can guarantee uniqueness across the different virtual networks.

Furthermore, routing tables or maps which do not implement radix tries can also be consolidated in a similar manner to implement consolidated lookups which take into account the extranet policies for two or more virtual networks, and as such, the scope of example aspects can be extended beyond radix tries. In some examples, the consolidation techniques can be implemented for states in the LISP mapping system or adapted for routing environments such as those implemented using Border Gateway Protocol (BGP), to reduce the amount of state created by an extranet policy.

Figure 6:
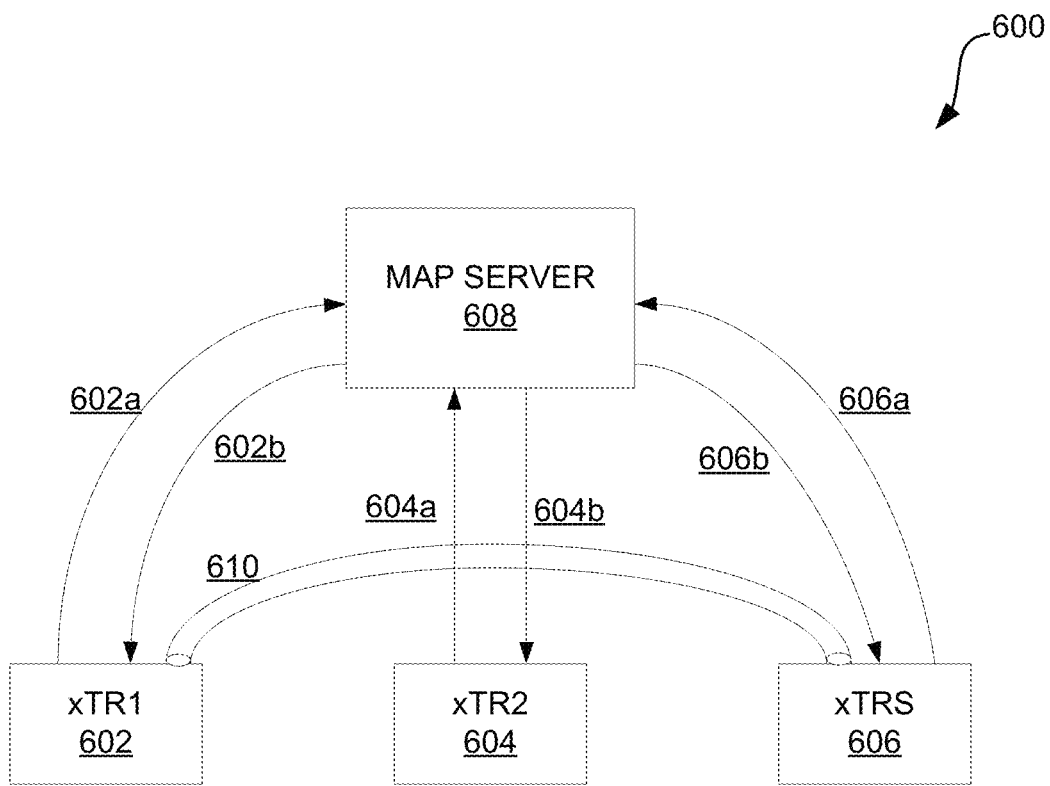
FIG. 6 illustrates aspects of a consolidated routing trie implemented in a map server utilizing LISP for two or more xTRs, in accordance with some examples.

FIG. 6 illustrates aspects of a network 600 implementing a Cisco Locator/ID Separation Protocol (LISP). The network 600 may also be designed according to the network architecture 100, and can include several network nodes. The LISP includes a routing architecture that provides semantics for IP addressing. While traditional IP routing and addressing architecture include a single numbering space, the IP address, to express both device identity as well as the manner in which the device attaches to the network, the LISP routing architecture separates the device identity, or endpoint identifier (EID), from its location, or routing locator (RLOC), into two different numbering spaces. Splitting the EID and RLOC functions can lead to advantages such as simplified routing operations and improved scalability and support.

In the network 600, a map server 608 is provided for maintaining a mapping database or routing protocols for connections within and amongst three xTRs (among various other possible xTRs). In some examples, the mapping database in the map server 608 can include a consolidated radix trie such as the consolidated radix trie 508.

Examples of the xTRs which can communicate with the map server 608 are designated as xTR1 602, xTR2 604, and xTRS 606. The xTRs 602-604 can include ingress/egress tunnel router functionalities for respective networks (or destinations/endpoints). For example, the xTR1 602 and the xTR2 604 can include ingress/egress tunnel router functionalities for respective private virtual networks such as VN1 502 and VN2 504 of FIG. 4, while the xTRS 606 can include ingress/egress tunnel router functionalities for a shared virtual networks such as VNS 506 of FIG. 4. The xTRs 602-606 can communicate with a map server 608 using communication paths which have been identified as 602a-b, 604a-b, and 606a-b, each of which can include different types of messages discussed further below.

As previously mentioned, the xTRs can include both ETR and ITR functionalities, which can be implemented in a LISP site's customer premises equipment (CPE) router. The xTRs can each include a local map cache which can reduce the amount of information or state used in performing lookups. For example, the map caches can hold the states or tuples or connection information for only the active (or recently active) traffic, rather than hold entire routing tables for various source-destination lookups.

In example implementations of the xTRs 602-606, the respective egress tunnel router (ETR) functionalities can include connecting a respective site or network (e.g., the virtual networks 502-506) to the map server 608, for example. The xTRs 602-606 can provide the radix tries for respective sites, for example, by publishing EID-to-RLOC mappings for the respective sites to the map server 608. For example, the ETRs of the xTRs 602-606 may send periodic Map-Register messages to the map server 608 on the paths identified respectively as 602a, 604a, and 606a. The Map-Register messages can contain all the EID-to-RLOC entries for the EID-numbered networks that are connected to the ETR's site. For example, the virtual networks 502-506 can provide their respective radix tries to the map server 608 using the Map-Register messages. The Map-Register messages from the various xTRs 602-606 can be used by the map server 608 to consolidate the policies from the various sites connected to the xTRs 602-606. For example, the map server 608 may build the consolidated radix trie 508 as discussed with reference to FIG. 5. In some examples, the map server 608 may generate consolidated extranet policies (e.g., for accesses to and between the various private networks, shared networks, etc.).

In example implementations of the xTRs 602-606, the respective ingress tunnel router (ITR) functionalities can include determining EID-to-RLOC mappings for traffic received for the destinations residing within respective virtual networks 502-506. When the ITR of an xTR receives a packet destined for an EID within a virtual network connected to the xTR, for example, the ITR can look for the EID in its map cache. If the EID exists in the map cache, the ITR finds a match the ITR can encapsulate the packet in a LISP header with the IP address of the source of the packet and an IP address of the destination found in the map cache entry, and route the packet to the destination EID, e.g., within a corresponding virtual network. On the other hand, if the EID does not exist in the ITR's map cache, then the ITR may send a respective Map-Request message (e.g., also following a respective path 602a, 604a, 606a) to the map server 608 and then discard the original packet. When the ITRs receive respective responses (e.g., on the paths identified as 60b, 604b, and 606b, respectively) to the Map-Request messages, the ITRs can create a new map cache entry with the contents of the Map-Reply message. When another packet, such as a retransmission for the original and, now, discarded packet arrives, the new map cache entry can be used for encapsulation and forwarding. In this manner, the ITRs can cache only the entries for which maps or routes are received from the Map-Reply messages, without having to store all the possible connections within an xTR and amongst various xTRs.

In some examples, the map server 608 can implement relevant extranet policies based on the consolidated mappings from the Map-Register messages (e.g., the consolidated radix trie). For example, the map server 608 can implement an extranet policy where requests from the two private virtual networks VN1 502 and VN2 504 managed by the xTR1 602 and xTR2 604, respectively, can be allowed to access EIDs within the individual virtual networks themselves, as well as in the shared virtual network VNS 506 managed by the xTRS 606. Similarly, the requests from the shared virtual network VNS 506 managed by the xTRS 606 can be allowed to EIDs in the two private virtual networks VN1 502 and VN2 504 managed by the xTR1 602 and xTR2 604, respectively. On the other hand, requests from the private virtual network VN1 502 can be prevented from reaching or connecting with EIDs in in the private virtual network VN2 504 and vice versa.

For example, if a request originates from the xTR1 602 for an EID, the map server 608 can perform a lookup in the consolidated radix trie 508 determine that the EID belongs to the shared VNS 506, and the request can be allowed. The xTR1 602 can be informed through a response from the map server 608 of the EID belonging to the xTRS 606, and the response can be cached in the map cache of the ITR of the xTR1 602. A tunnel 610 may be established for an end-to-end routing between the xTR1 602 and the xTRS 606 for the request. A similar process can be followed for a request from the xTR2 604 with an EID in the xTRS 606, and for requests from the xTRS 606 with EIDs in either one of the xTRs 602 and 604. However, for requests which are prevented or disallowed per the extranet policies maintained by the map server 608 (e.g., between xTR1 602 and xTR2 604), a negative response may be provided, as mentioned previously.

It will be appreciated that by maintaining the consolidated radix trie in the map server 608 and implementing the extranet policy for lookups in the map server 608, efficiencies can be gained. For example, if such a consolidated radix trie were not present, the map server 608 may need to search for an EID of a request from the xTR1 602, first within the radix trie for the xTR1 602 itself, followed by stepwise concatenated searches among all shared xTRs such as the xTRS 606 if there is a miss within the xTR1 602. If such a consolidated radix trie were not present, the inefficiency of such a process may be further compounded for requests originating from the shared xTRs such as the xTRS 606 if there is a miss within the xTRS 606, because the subsequent searches may have to step through radix tries for all private networks (e.g., pertaining to xTR1 602, xTR2 604, etc.) which may share the xTRS 606. Further, if a consolidated extranet policy implementation were not included in the map server 608 (e.g., using the coloring previously described), policy based decisions may be made subsequent to the stepwise searching through the various xTRs. Accordingly, the example implementations efficiently overcome the various above-described challenges.

Figure 7:
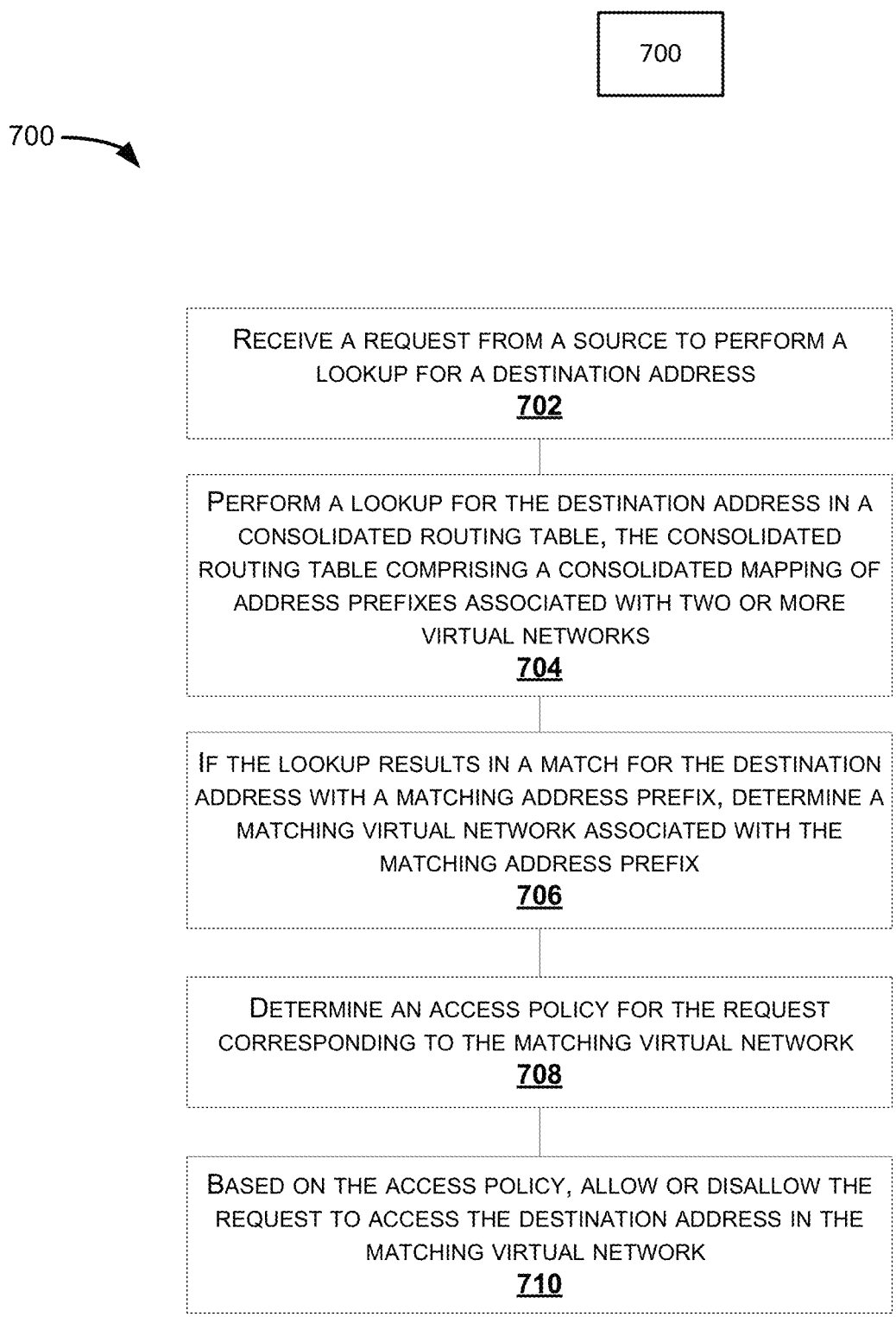
FIG. 7 illustrates a process of implementing an extranet policy for communication between two or more virtual networks, in accordance with some examples.

Having described example systems and concepts, the disclosure now turns to the process 700 illustrated in FIG. 7.

The blocks outlined herein are examples and can be implemented in any combination thereof, including combinations that exclude, add, or modify certain steps.

At the block 702, the process 700 includes receiving a request from a source to perform a lookup for a destination address. For example, the mapping system or map server 608 can receive a request with a source IID and a destination EID tuple.

At the block 704, the process 700 includes performing a lookup for the destination address in a consolidated routing table, the consolidated routing table comprising a consolidated mapping of address prefixes associated with two or more virtual networks. For example, the lookup can be performed by the mapping system or map server in a consolidated radix trie 508 which includes a consolidated mapping of IP address prefixes of VNs 502-506.

At the block 706, the process 700 includes, if the lookup results in a match for the destination address with a matching address prefix, determining a matching virtual network associated with the matching address prefix. For example, if the IP address of one of the leaf nodes 508e has a match with the destination EID in the request, then the color associated with a matching radix trie is obtained, where the color can indicate which one of the virtual networks 502-506 is a matching virtual network. In some examples, if the lookup results in the match, an address of a home node (e.g., an IP address of one of the home nodes 502h-506h) and a routing locator (RLOC) for the destination address in the matching virtual network can be provided to the source, and if the lookup does not result in a match or if the access policy indicates disallowing the request, a negative map-reply can be provided to the source.

At the block 708, the process 700 includes determining an access policy for the request corresponding to the matching virtual network. In an example, the access policy can be an extranet policy for the two or more virtual networks, wherein the extranet policy comprises one or more of allowing access to a shared virtual network from one or more private virtual networks, allowing access to one or more private virtual networks from the shared virtual network, or preventing access from one private virtual network to another private virtual network. For example, the access policy can include a virtual network connectivity or extranet policy, where shared IP prefixes in the shared virtual network VNS 506 can establish connections with private IP prefixes that reside in private virtual networks VN1 502 and VN2 504, without allowing endpoints in the private virtual networks VN1 502 and VN2 504 to communicate with each other. Thus, private IP prefixes in the private virtual networks VN1 502 and VN2 504 may reach or connect with shared IP prefixes in the shared virtual network VNS 506 and the shared IP prefixes in the shared virtual network VNS 506 may reach or connect with the private IP prefixes in the private virtual networks VN1 502 and VN2 504. However, the private IP prefixes in the private virtual network VN1 502 is prevented from reaching or connecting with private IP prefixes in in the private virtual network VN2 504 and vice versa. In some examples, all addresses across the two or more routing tables are unique.

At the block 710, the process 700 includes, based on the access policy, allowing or disallowing the request to access the destination address in the matching virtual network. For example, if the request originated at the virtual network VN1 502, the source IID of the tuple would indicate an IP prefix in the virtual network VN1 502. If the destination EID of the request is in the shared virtual network VNS 506, then the request may be allowed to proceed, as per the extranet policy explained above. The mapping system may permit this request to proceed by evaluating the destination EID of the request against the color or home IID of the matching leaf node and determining that the home IID resides in the shared virtual network VNS 506, for which access is allowed from the virtual network VN1 502. In some examples, the mapping system can provide a response, referred to as a map-reply which includes the home IID obtained from the color of the matching leaf node, as well as a routing locator (RLOC) for the destination EID of the request, to the source or originator of the request. This way, the request may be routed to its destination EID using the home IID and the RLOC within the shared virtual network VNS 504.

Accordingly, in some aspects, each of the two or more virtual networks comprises a respective radix trie, e.g., as shown for the virtual networks 502-506, and the consolidated routing table includes a consolidated radix trie 508. In some aspects, the consolidated routing table comprises a radix trie for mapping respective address prefixes of the matching virtual network to an address of a home node (e.g., the home nodes 502*h*, 504*h*, 506*h*) of the matching virtual network, where allowing the request to access the destination address in the matching virtual network comprises using the radix trie of the matching virtual network to route the request to the home node of the matching virtual network.

In some aspects, determining the matching virtual network associated with the matching address prefix includes obtaining a color associated with the matching address prefix and evaluating the request based on the color. For instance, the color can be an attribute or metadata associated with the one of the leaf nodes 508*e* which may have a matching address prefix corresponding to the destination IID of the request. In the above example, the color is a home node or home IID.

In some aspects, the two or more virtual networks can be connected to respective two or more ingress/egress tunnel routers (xTRs), e.g., the xTRs 502-506 and wherein the consolidated routing table is implemented in a map server (e.g., the map server 508) in Locator/ID Separation Protocol (LISP) based communication with the two or more xTRs.

Figure 8:
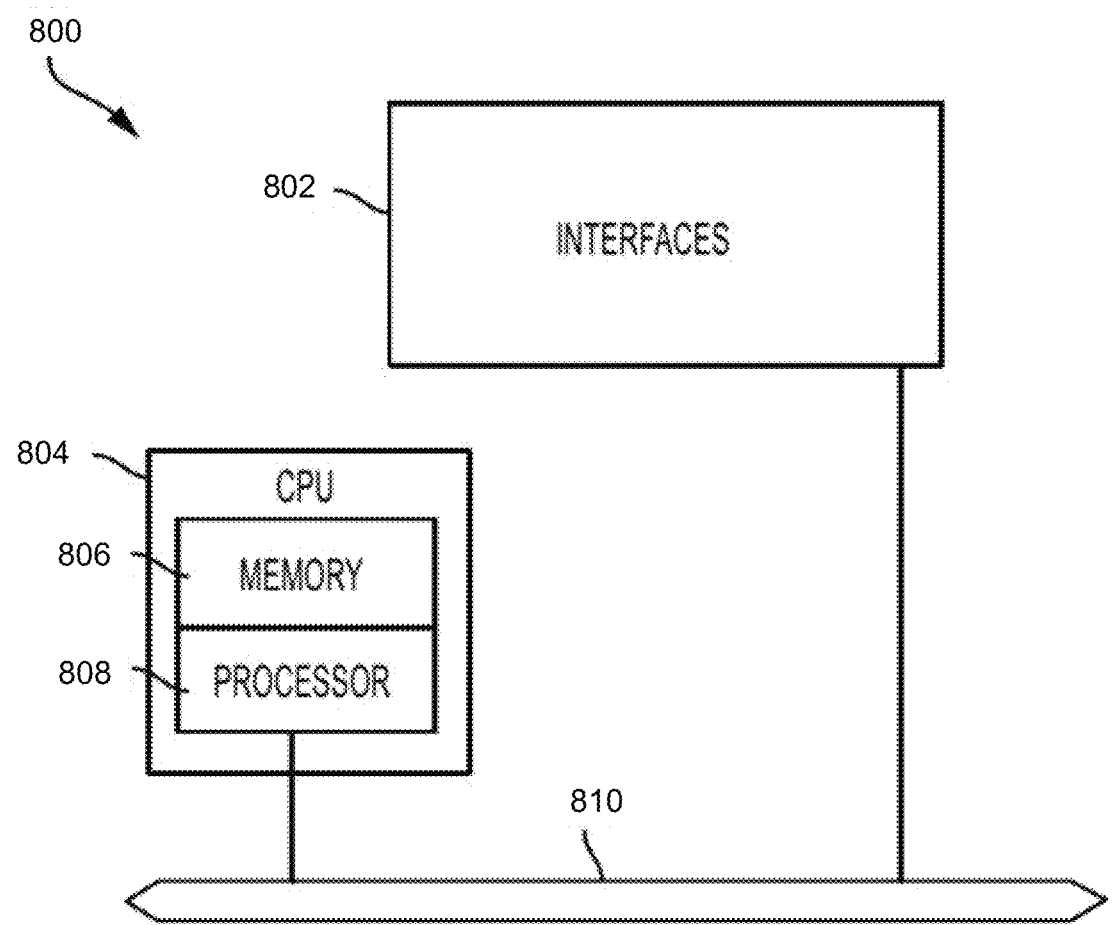
FIG. 8 illustrates an example network device in accordance with some examples.

FIG. 8 illustrates an example network device 800 suitable for implementing the aspects according to this disclosure. In some examples, the networks 500, 600 may be implemented according to the configuration of the network device 800. The network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. The CPU 804 may include one or more processors 808, such as a processor from the INTEL X86 family of microprocessors. In some cases, processor 808 can be specially designed hardware for controlling the operations of the network device 800. In some cases, a memory 806 (e.g., non-volatile RAM, ROM, etc.) also forms part of the CPU 604. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

Figure 9:
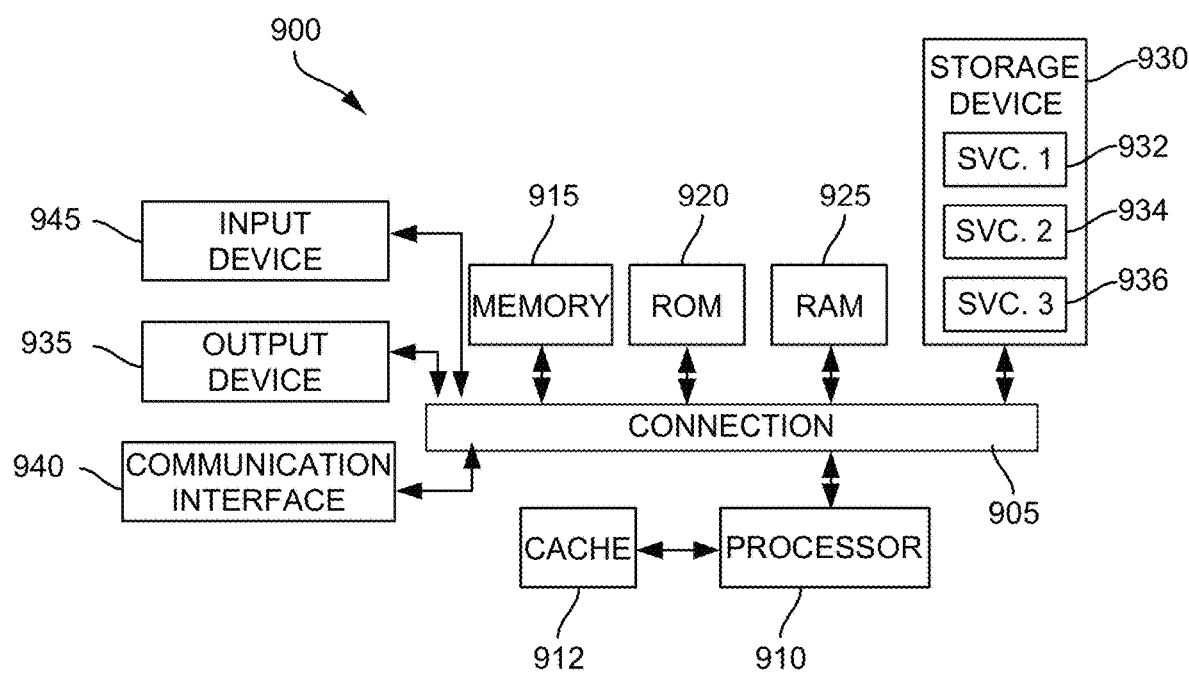
FIG. 9 illustrates an example computing device architecture, in accordance with some examples.

FIG. 9 illustrates an example computing device architecture 900 of an example computing device which can implement the various techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, at a processor, a request from a source to perform a lookup for a destination address;
performing a lookup for the destination address in a consolidated routing table of a map server, the consolidated routing table comprising a consolidated radix trie for mapping of address prefixes associated with two or more virtual private networks with at least one shared virtual network, the consolidated radix trie consolidates radix tries of the two or more virtual private networks with the at least one shared virtual network as an intermediary;
when the lookup results in a match for the destination address with a matching address prefix, determining a matching virtual network associated with the matching address prefix;
determining an access policy for the request corresponding to the matching virtual network, wherein the access policy is configured to at least: allow access to at least one of the two or more virtual private networks from the at least one shared virtual network, allow access to the at least one shared virtual network from at least one of the two or more virtual private networks, and not allow access from one of the two or more virtual private networks with another one of the two or more virtual private networks; and based on the access policy, allowing or not allowing the request to access the destination address in the matching virtual network.

2. The method of claim 1, wherein the consolidated radix trie for mapping respective address prefixes of the matching virtual network to an address of a home node of the matching virtual network.

3. The method of claim 2, wherein allowing the request to access the destination address in the matching virtual network comprises using the consolidated radix trie to route the request to the home node of the matching virtual network.

4. The method of claim 2, further comprising providing the address of the home node and a routing locator corresponding to the request, to the source.

5. The method of claim 1, wherein determining the matching virtual network associated with the matching address prefix comprises obtaining a color associated with the matching address prefix and evaluating the request based on the color.

6. The method of claim 5, wherein the color is an attribute or metadata associated with the matching address prefix.

7. The method of claim 1, wherein if the lookup does not result in a match or if the access policy indicates disallowing the request, providing a negative map-reply to the source.

8. The method of claim 1, wherein the two or more virtual private networks are connected to respective two or more ingress/egress tunnel routers (xTRs), and wherein the consolidated routing table is implemented in a map server in Locator/ID Separation Protocol (LISP) based communication with the two or more xTRs.

9. The method of claim 1, wherein all address prefixes of the consolidated routing table are unique addresses.

10. A system, comprising:
one or more processors; and
a non-transitory computer-readable storage medium containing instructions which, when executed on the one or more processors, cause the one or more processors to perform operations including:
receiving a request from a source to perform a lookup for a destination address;
performing a lookup for the destination address in a consolidated routing table of a map server, the consolidated routing table comprising a consolidated radix trie for mapping of address prefixes associated with two or more virtual private networks with at least one shared virtual network, the consolidated radix trie consolidates radix tries of the two or more virtual private networks with the at least one shared virtual network as an intermediary;
when the lookup results in a match for the destination address with a matching address prefix, determining a matching virtual network associated with the matching address prefix;
determining an access policy for the request corresponding to the matching virtual network, wherein the access policy is configured to at least: allow access to at least one of the two or more virtual private networks from the at least one shared virtual network, allow access to the at least one shared virtual network from at least one of the two or more virtual private networks, and not allow access from one of the two or more virtual private networks with another one of the two or more virtual private networks; and based on the access policy, allowing or not allowing the request to access the destination address in the matching virtual network.

11. The system of claim 10, wherein the consolidated radix trie for mapping respective address prefixes of the matching virtual network to an address of a home node of the matching virtual network.

12. The system of claim 11, wherein allowing the request to access the destination address in the matching virtual network comprises using the consolidated radix trie to route the request to the home node of the matching virtual network.

13. The system of claim 11, further comprising providing the address of the home node and a routing locator corresponding to the request, to the source.

14. The system of claim 10, wherein determining the matching virtual network associated with the matching address prefix comprises obtaining a color associated with the matching address prefix and evaluating the request based on the color.

15. The system of claim 14, wherein the color is an attribute or metadata associated with the matching address prefix.

16. The system of claim 10, wherein if the lookup does not result in a match or if the access policy indicates disallowing the request, providing a negative map-reply to the source.

17. The system of claim 10, wherein the two or more virtual private networks are connected to respective two or more ingress/egress tunnel routers (xTRs), and wherein the consolidated routing table is implemented in a map server in Locator/ID Separation Protocol (LISP) based communication with the two or more xTRs.

18. A non-transitory machine-readable storage medium, including instructions configured to cause a data processing apparatus to perform operations including:
receiving a request from a source to perform a lookup for a destination address;
performing a lookup for the destination address in a consolidated routing table of a map server, the consolidated routing table comprising a consolidated radix trie for mapping of address prefixes associated with two or more virtual private networks with at least one shared virtual network, the consolidated radix trie consolidates radix tries of the two or more virtual private networks with the at least one shared virtual network as an intermediary;
when the lookup results in a match for the destination address with a matching address prefix, determining a matching virtual network associated with the matching address prefix;
determining an access policy for the request corresponding to the matching virtual network, wherein the access policy is configured to at least: allow access to at least one of the two or more virtual private networks from the at least one shared virtual network, allow access to the at least one shared virtual network from at least one of the two or more virtual private networks, and not allow access from one of the two or more virtual private networks with another one of the two or more virtual private networks; and
based on the access policy, allowing or not allowing the request to access the destination address in the matching virtual network.

19. The non-transitory machine-readable storage medium of claim 18, wherein the consolidated radix trie for mapping respective address prefixes of the matching virtual network to an address of a home node of the matching virtual network.

20. The non-transitory machine-readable storage medium of claim 19, wherein allowing the request to access the destination address in the matching virtual network comprises using the consolidated radix trie to route the request to the home node of the matching virtual network.

\* \* \* \* \*